May 22, 1956　　　H. H. BEARDSLEY　　　2,746,324
TOOL FOR APPLYING PRESSURE CLAMPS
Filed Nov. 3, 1952　　　2 Sheets-Sheet 1

INVENTOR.
Harold H. Beardsley
BY
Lampher & Van Valkenburgh
ATTORNEYS

May 22, 1956 H. H. BEARDSLEY 2,746,324
TOOL FOR APPLYING PRESSURE CLAMPS
Filed Nov. 3, 1952 2 Sheets-Sheet 2

INVENTOR.
Harold H. Beardsley
BY
Lamphere & Van Valkenburgh
ATTORNEYS

United States Patent Office 2,746,324
Patented May 22, 1956

2,746,324

TOOL FOR APPLYING PRESSURE CLAMPS

Harold H. Beardsley, Lakewood, Colo., assignor to Band-It Company, Denver, Colo., a corporation of Colorado Application November 3, 1952, Serial No. 318,420

13 Claims. (Cl. 81—9.3)

This invention relates to tools for and methods of applying pressure clamps.

Pressure clamps are useful for many purposes, such as for attaching hoses to nipples and the like; for assembling and repairing wooden water pipes, tying conduit or cable to pipes, girders and the like, clamping guy wire guards, fastening street and highway signs to poles, girders and the like, and other construction uses; for splicing electric welding cable, making up flexible cable line taps, and other electrical uses; and for repairing pipe or tank leaks, and other repair uses. Pressure clamps, of the type to which this invention relates, include generally a length of strap or strapping, normally metal, which extends around an article or portion thereof to which the clamp is to be applied, and a buckle or connector by which the ends of the strapping are attached together. Such connectors should be adapted to permit the strapping to be pulled tight, prior to final attachment to the connector, and when a comparatively high clamping pressure is to be maintained, such as in attaching high pressure hoses to nipple and the like, more than one revolution of the strap is generally desirable.

It is customary to attach one end of a length of strap to the buckle or connector, pass the other end of the strap around the article to be clamped one or more times, and then use a special tool to exert a sufficient pull on the free end of the strap, so that the desired clamping pressure is obtained. Such a tool may be of the type shown in U. S. Patent No. 2,208,114, and may include a slide which is provided with a strap gripping device and is movable along a frame, as by a screw, to apply tension on the strap with the nose of the tool abutting against the buckle or connector. A cutter is mounted in the nose of the frame, for cutting off the unused portion of the strap, while the nose of the tool frame and also the slide are provided with a guide slot, which is open at one side to facilitate insertion of the strap. One type of buckle or connector is provided with ends and sides, an offset transverse central rib, and an upstanding ear at each side, the latter being hammered down over the end of the strap, after the desired tension has been placed thereon and the strap has been bent back over the buckle and the free end cut off. The fixed end of the strap is bent around underneath the central buckle rib prior to installation, and lies against the article to which the clamp is applied. Tools and buckles of the above types are sold widely, being used particularly when extremely high clamping pressures are desired. Such buckles and the straps utilized therewith may be made of stainless steel to provide substantially maximum material strength, but the buckles require relatively complicated stamping operations for manufacture. Also, in the complete clamp, the free end of the strap is exposed and tends to extend from the buckle, thus tending to catch on objects or clothing, as when used as hose clamps. Furthermore, after the free end of the strap has been cut off, it must be hammered down against the buckle and each of the ears also hammered down against the end of the strap, thus increasing the installation time. Mild steel is a suitable strapping material for uses in which the higher strength of stainless steel is not required, and is also cheaper than stainless steel. However, the buckles heretofore used with mild steel strapping have either been difficult or costly to make, or tend to permit the strap to slip long before the load on the strap has approached its tensile strength. Thus, a simple buckle which encircles the strap and is either punched into the strap from the top, or deformed at the side so as to deform the strap simultaneously, does not utilize the full strength of the strap.

A recent improvement in pressure clamps, as disclosed and claimed in the copending application of Holbrook Mahn, Serial No. 321,006, filed November 17, 1952, permits the buckle and clamp to be made simply and the full strength of the strapping to be utilized, as well as eliminating the previously objectionable exposed free end of the strap. For such a clamp, the buckle may be a flattened U in transverse section, having merely a top, sides, and a bottom split down the center. The top may be provided with one or more transverse ridges, and one end of the strap may merely be passed through the buckle and bent around under the bottom of the buckle. The remainder of the strap passes around the article to be clamped one or more times, each time passing through the buckle, and the opposite end of the strap is tensioned, then bent upwardly against the upper edge of the buckle and cut off. The free end is cut as closely as possible to the edge of the buckle, and filed or otherwise removed so as to be flush with or below the upper surface of the buckle. Previous types of tools for applying clamps did not permit the strap to be sheared flush with the buckle top, and it will be evident that a tool which can be utilized therefor has great value.

Among the objects of the present invention are to provide a novel method of applying a pressure clamp; to provide such a method which is particularly useful in applying a pressure clamp of the type of the copending application of Holbrook Mahn, supra; to provide such a method which involves a minimum of operations; to provide a novel tool for applying clamps; to provide such a tool which is especially adapted to co-operate with the buckle or connector in producing the clamp of the aforesaid copending application of Holbrook Mahn; to provide such a tool which may be made in the form of an attachment for an existing type of tool, or as an independent tool; and to provide such a tool or attachment for applying pressure clamps which is sturdy in construction and reliable in use and operation.

Additional objects and the novel features of this invention will become apparent from the following description, taken in connection with the accompanying drawings, in which.

Figure 1:
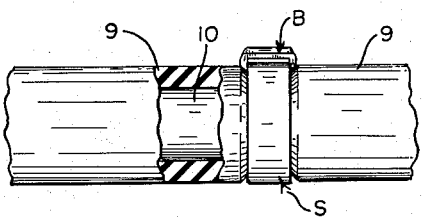
Fig. 1 is a side elevation of a clamp, which the tool of this invention is particularly useful in applying, such as to a hose to be attached to a ferrule or nipple.
Figure 2:
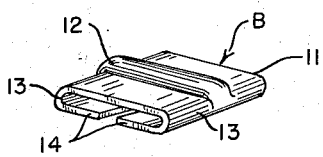
Fig. 2 is a perspective view of a buckle or connector of the clamp of Fig. 1.
Figure 3:
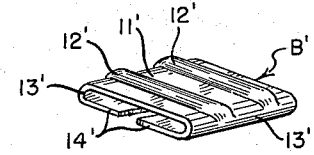
Fig. 3 is a perspective view of an alternative buckle or connector.

As illustrated in Fig. 1, the clamp of the aforesaid copending application of Holbrook Mahn, may comprise a buckle B adapted to secure the ends of a strap S around a hose 9, with sufficient tension on the strap S to securely clamp the hose 9 to a nipple 10. It will be understood, of course, that the clamp may be applied in other situations, such as those indicated previously, and also that the strap S and buckle B may be made of any desired material, such as mild steel, although stainless steel or material having a lesser or greater tensile strength than mild steel may be utilized. The buckle B, as in Fig. 2, preferably has open ends, through which the strap may extend, and may be stamped or otherwise formed, as from a flat strip. The top 11 of the buckle may be provided with a transverse ridge 12, as in Fig. 2, or as in the case of the buckle B' of Fig. 3, the top 11' may be provided with a pair of transverse ridges 12', it being observed that the buckle B' of Fig. 3 is generally adapted to be utilized for the larger sizes, or strapping having a greater width or thickness and thus requiring greater strength in the buckle. The ridges 12, or 12', may be formed at spaced intervals in a strip, which may be cut into successive lengths, each suitable for forming a single buckle. Thus, the portion of the strip before and behind the ridge or ridges may be bent downwardly and then under, to form the sides 13, or 13', and the bottom flanges 14, or 14', the edges of which may meet or form a longitudinal slot. The sides 13, or 13', of the buckle B, or B', may be rounded, as shown, or flat if desired, while it is normally unnecessary to weld or attach the ends of the flanges 14, or 14', together to form a complete closure.

Figure 4:
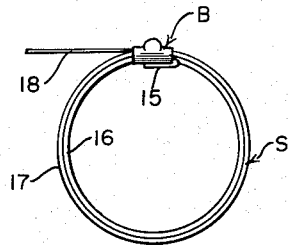
Fig. 4 is a side elevation, on a reduced scale, of a strap and buckle assembly, which may be utilized in forming the clamp of Fig. 1.
Figure 5:
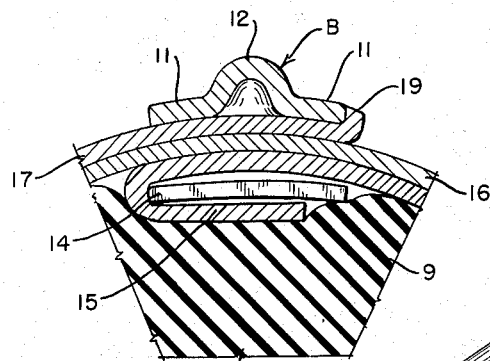
Fig. 5 is an enlarged, fragmentary transverse section taken through the clamp of Fig. 1, at the buckle or connector.

In applying the pressure clamp of Fig. 1, a fixed end 15 of the strap S may be bent around so as to lie underneath the bottom flanges 14, as in Fig. 5, and more than one layer, such as an inner loop 16 and an outer loop 17, passed around the article to be clamped and through the buckle. Tension is applied to the free end 18 of the strap, by a suitable tool, such as the tool T of Fig. 6, described later. The strapping may be obtained from a continuous roll, but preferably a buckle and strap unit, as shown in Fig. 4, is utilized. In the latter, the fixed end 15 of the strap is bent under the buckle, and two loops 16 and 17 of strapping extend through the buckle, with the free end 18 being left sufficiently long to permit the tension tool to be attached thereto.

After sufficient tension has been applied to the strap, to produce the desired clamping pressure, the free end 18 of the strap is bent upwardly against the end of the buckle top 11, and the free end then cut off at a point as closely as possible to the top of the buckle. With previous tools, such as the tool T without the attachment A, after cut off and removal of the tool, the severed end will still extend considerably above the top of the buckle, and may, therefore, be cut off closer to the buckle top by a chisel, cutters, pliers, or the like, and then filed down until flush with, or slanting downwardly from the top of the buckle, as in the case of the strap end 19 of Fig. 5. As will be evident, the previously objectionable projecting portion is eliminated. Tests of clamps so made have shown that the full strength of the strapping can be developed, by the cut-off end of the strap engaging the end of the buckle by a substantially right angle turn, and while a highly satisfactory clamp can be applied in the manner described above, the additional cut-off and filing operations are too time-consuming for frequent use. However, the method and the tool and tool attachment of this invention permit the free end of the strap to be sheared flush with the top of the buckle, in a single operation.

Figure 6:
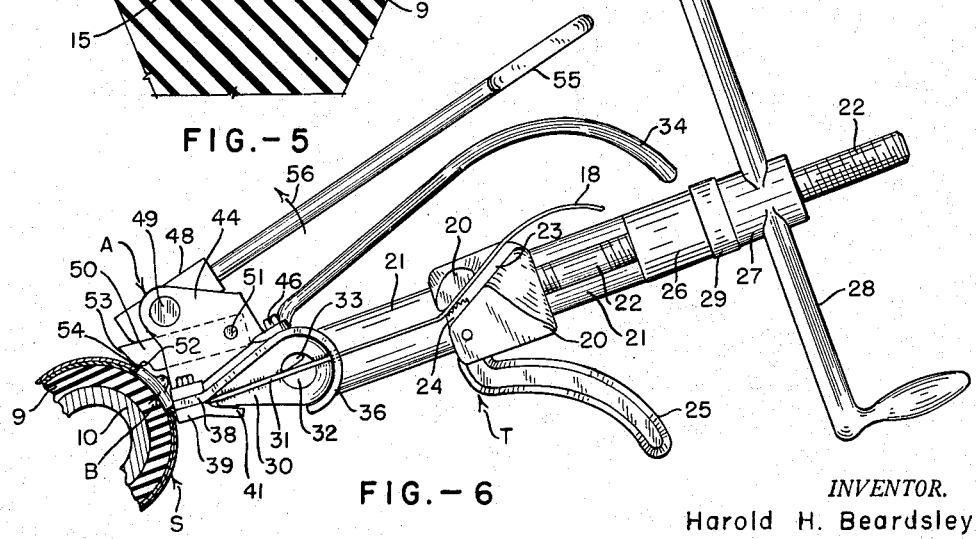
Fig. 6 is a side elevation of a previous type of tool provided with an attachment constructed in accordance with this invention, shown in a position preparatory to severance of the free end of the strap.
Figure 8:
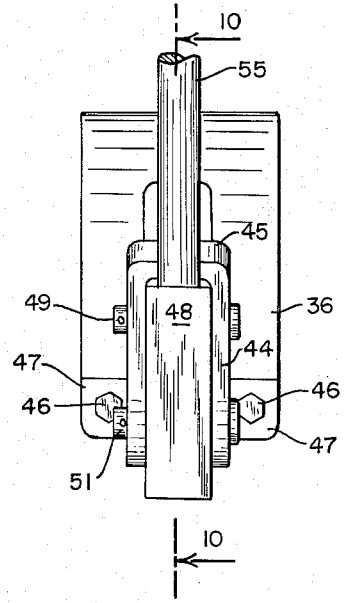
Fig. 8 is a top plan view of the tool attachment shown in Fig. 6.
Figure 9:
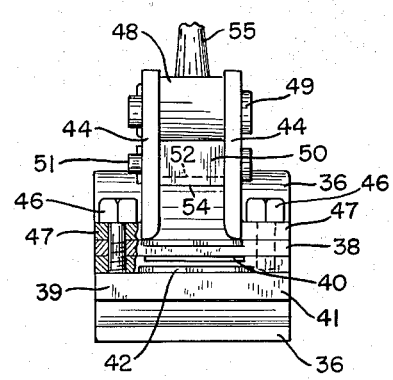
Fig. 9 is a front elevation of the tool attachment of Fig. 6.

The tension tool T shown in Fig. 6 is constructed generally in accordance with U. S. Patent No. 2,208,134, and includes a slide 20 adapted to be moved along a frame 21 by a fixed screw 22, the slide 20 having an angular slot 23 therein, into which the strap may be passed so as to be clamped by the serrated edges of a clamping cam 24, pivotally mounted in the slide 20 and operated by a handle 25. Screw 22 extends through a journal 26, preferably formed integrally with the frame 21 at the outer end thereof, while the screw 22 engages an interiorly threaded block 27 which may be rotated by a tension handle 28, the thrust of the handle being transferred through a ball bearing ring 29 to the frame at journal 26. A substantially V-shaped nose 30 is disposed at the front end of the frame 21, being preferably formed integrally therewith and provided with a longitudinal slot 31, open at one side for readier insertion of the strap S. In the previously normal use of the tool T, the end of nose 30 is placed against the end of a buckle and the tension handle 28 rotated to pull the free end of the strap through the buckle until the desired tension is obtained.

The nose 30 of tool T may also be provided with a cylindrical, transverse hole 32, in which a tapered cutter 33 is mounted for rotation, the cutter being adapted to be turned by a handle 34. As will be evident, the cutter 33 severs the strap S at a point spaced a greater distance from the buckle B than is desired for the present invention, so that the cutter 33, alhough particularly useful in installing clamps of a type previously described, is not necessary for carrying out the present invention. However, the cutter may be left on the tool, and an attachment A of Fig. 6, constructed in accordance with this invention, mounted thereon, so that the tool T may be used for installing clamps of the type of the copending application of Holbrook Mahn.

Figure 7:
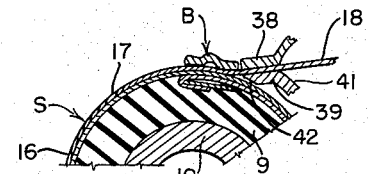
Fig. 7 is a fragmentary transverse section illustrating the use of the tool in application of tension to the clamp strap.
Figure 10:
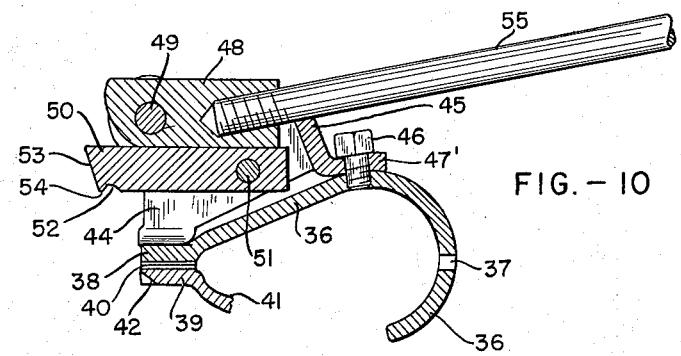
Fig. 10 is a longitudinal section, taken along line 10—10 of Fig. 8.

The attachment A, as in Figs. 6 and 8–10, includes a frame 36 which may be constructed so as to partly encircle the nose 30 of the tool T, and provided with a slot 37, as in Fig. 10, to permit the strap 18 to pass through. The frame 36 terminates at its front end in a laterally extending bar 38, to the underside of which is attached a shear plate 39 provided with a shearing edge along the front of a slot 40, through which the strap passes. Shear plate 39 also may be provided with an extension 41, which engages the underside of nose 30 of the tool T, and a groove 42 of Figs. 9 and 10, slanting rearwardly from the front edge and having a width greater than the buckle B. The shearing edge of the shear plate 39, at slot 40, may be beveled slightly, to prevent any tendency for "shaving off" the strap while the strap moves between the plates 38 and 39 during tensioning, while the forward edge of groove 42 may be rounded, to prevent the shear plate from cutting into the loop 17 of the strap during tensioning. Groove 42 permits the shear plate 39 to lie closer to the strap loop 17 when tension is applied to the free end 18 of the strap, as in Fig. 7, so that tension on the free end may be applied along a line more nearly tangential to loop 17, i. e., more nearly in the plane of buckle B. In applying tension, bar 38 is placed against the end of the buckle, and the free end 18 of the strap, previously clamped by cam 24 of Fig. 6, pulled by rotation of handle 28, as previously described.

The attachment A also includes a bracket 44 having upwardly extending sides, open at the front and connected at the rear by a back 45 and mounted on the top of frame 36, as by cap screws 46 which extend through flanges 47 and 47', the flanges 47 extending laterally outwardly from the forward end of each of the bracket sides and the flange 47' extending rearwardly from the back 45. The cap screws 46 also conveniently attach shear plate 39 to frame 36, as in Fig. 9. Pivotally mounted between the bracket sides are a cam 48 on a pin 49, disposed at an upper forward position, and a lever 50 on a pin 51 disposed in a rear position. Lever 50 has a lateral notch 52 on its underside adjacent its preferably slanted front end 53 to provide a point 54 for engaging the end of buckle B opposite the free end of the strap, the width of lever 50 preferably being at least a substantial proportion of the width of the widest strap to be cut, while a handle 55 may be attached to cam 48 for rotating the same. When the cam handle 55 is moved rearwardly and against the bracket back 45, as in Fig. 10, the rear end of cam 48 will maintain lever 50 in its normal position, so that the free end 18 of the strap may be passed through slot 40 and back through slot 31 in the tool nose 30 and then through slot 23 in slide 20, clamping cam 24 then wedged against the strap, and tension applied by rotating handle 28, as indicated previously. When sufficient tension has been applied, the tool is moved to bend the strap back toward the edge of buckle B, when the clamp is being applied to a pipe, girder, or the like, which is in fixed position, or the tool may be maintained in fixed position, as in a vise, and the hose or other readily movable article to which the clamp is being applied, rolled over or rotated relative to the tool, so that the free end of the strap will be bent back over to the position of Fig. 6. During such bending, the tension handle 28 is preferably rotated slightly in a reverse direction, to prevent the strap from being broken, but will not cause any tension to be lost, since the bend in the strap will take up the amount of strap released.

The tool and strap will then be in the position of Fig. 6, in which the point 54 of lever 50 has moved onto the opposite end of the buckle B. From the position of Fig. 6, the only operation needed to complete the application of the clamp is to move the handle 55 in the direction of arrow 56, i. e., outwardly, so that the force applied by lever point 54 will cause the shear blade 39 to cut through the strap to produce the sheared end 19 of Fig. 5. During the shearing operation, the end of the buckle acts as a backing member for the shear blade 39, i. e., the buckle itself forms one jaw of a cutting tool, as it were. As will be evident, when the shearing operation is concluded, the clamp is completed, and no additional operations are necessary. Thus, after removing the severed end of the strap from the tool, the operator is ready to apply the next clamp.

While the tool T of Fig. 6 is useful in applying other types of clamps, by the removal of attachment A, it may be desired to provide a tool which does not require a separate attachment and involves no unnecessary parts for operation in accordance with this invention, such as the cutter 33 and handle 34 therefor of the tool T. The tool T' of Fig. 11, constructed in accordance with this invention, fulfills these requirements and includes several parts similar to corresponding parts of tool T of Fig. 6, such as a slide 20 movable along a frame 21' by a fixed screw 22, and a clamping cam 24 adapted to clamp the free end 18 of the strap in an angular slot 23 of slide 20. Although not shown in Fig. 11, it will be understood that the tool T' will also include other parts of tool T shown in Fig. 6, these including the handle 25 for clamping cam 24, journal 26, ball bearing ring 29, interiorly threaded block 27, and handle 28 for rotating the latter, it being understood that these similar parts may be operated in the same manner as previously described. The nose 30' of tool T', which may be formed integrally with frame 21', is similarly provided with a slot 31' through which strap end 18 passes, but terminates at the front in a bar 60, corresponding in shape to bar 38 of attachment A, and is cut away below bar 60 to accommodate a shear plate 39', which corresponds to shear plate 39 of attachment A, but with the omission of extension 41. Thus, shear plate 39' may be provided with a groove 42', but its rear edge may abut against the front edge of the lower portion of nose 30'. The remainder of the parts at the front of the tool T' may correspond to parts of attachment A, i. e., the bracket 44 having a back 45 and ears 47 through which cap screws 46 extend to attach the bracket and shear plate 39' to bar 60, the cam 48 pivoted on pin 49, the cam handle 55, and the lever 50 pivoted on pin 51 and provided with notch 52 and point 54. It will be evident, of course, that the slot between bar 60 and shear plate 39' may extend to one side, so that the strap may be placed in the slot from the side, as by cap screw 46 on one side extending only into bar 60, or the ear 47 on that side being shifted to a position in which the cap screw may engage a thicker portion of nose 30', and shear plate 39' separately attached to nose 30' at that side, as by an ear for a cap screw extending to the side or beneath nose 30', or a portion of nose 30' extending over shear plate 39'.

Figure 11:
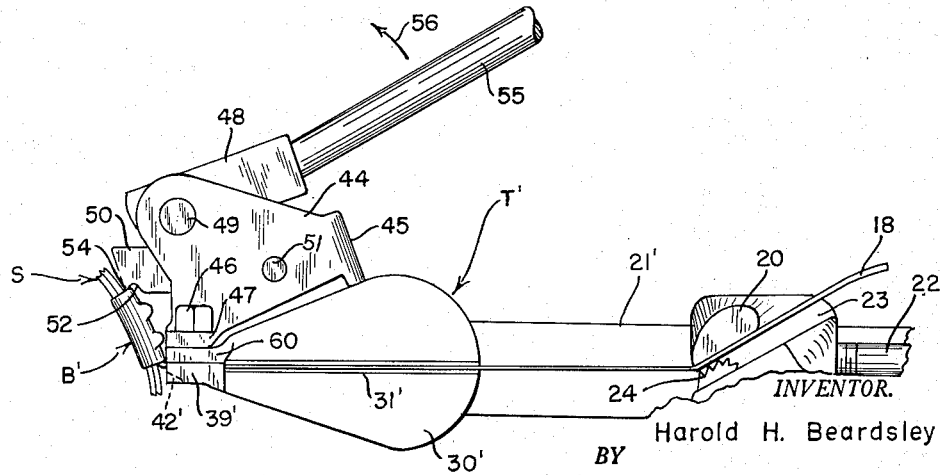
Fig. 11 is a fragmentary side elevation, showing the front end of a tool constructed in accordance with this invention, including parts similar to those of the attachment shown in Figs. 6 and 8–10, inclusive.

The tool T' is used in applying a clamp in the same manner as described for tool T provided with attachment A, i. e., in general, tightening the strap, bending it back against the edge of the buckle, and finally moving the cam handle 55 in the direction of arrow 56 of Fig. 11 to shear the strap and produce the sheared edge 19 of Fig. 5. The tool T with attachment A, as in Fig. 6, and the tool T', as in Fig. 11, are each adapted to carry out the method of this invention. Thus, the method of this invention for applying a pressure clamp involves the tightening of the strap through a buckle, bending the strap against the end of the buckle, and the novel step of shearing the strap by a shearing force applied to the strap at one edge of the buckle, and an opposing force applied through the buckle. The shearing force applied to the strap is preferably in a direction slanting upwardly slightly toward the upper surface of the buckle, while the opposing force is preferably applied to the opposite end of the buckle and over a comparatively large portion of its width. From another standpoint, the method of this invention involves the utilization of the buckle itself to resist the shearing force applied to the strap, and more particularly the end of the buckle against which the strap is bent prior to shearing.

The material of which parts of the tool T, attachment A, and tool T' are made may be selected to provide sturdiness and reliability. Thus, cast steel may be utilized for the frame 21 or 21', including nose 30 or 30' and journal 26, which may be cast integrally therewith, for the slide 20, for the handle 25, and for the block 27 and handle 28. Cold rolled steel, properly machined, may be utilized for the screw 22, for the bracket 41, and for the cam handle 55. Properly machined cold rolled steel, hardened by suitable heat treatment after carburization, cyanide treatment, or the like, may be utilized for the cam 48, for the lever 50, and for the pins 49 and 51, while a high strength alloy steel, hardened and ground to suitable tolerance dimensions, may be utilized for the shear plate 39 or 39'. Other suitable materials may, of course, be utilized.

From the foregoing, it will be evident that the method and tool of this invention fulfill to a marked degree the requirements and objects hereinbefore set forth. Thus, by applying a shearing force to the strap and an opposing force through the buckle, the strap may be sheared at a desired point so that further operations to provide a desired shearing edge of the strap may be eliminated. Particularly when the shearing force is applied in a direction slightly upward toward the top of the buckle, with the strap bent upwardly against the end of the buckle, a flush or downwardly slanted strap end is produced. In fact, a small portion of the buckle itself may be removed during the shearing operation, in order to insure a smooth, flush cut end to the strap. The tool of this invention is particularly adapted to carry out the method thereof, and also is reliable in use in operation, since, with the preferred construction, only one simple operation—that of rotating the cam handle through an arc—is necessary to sever the strap at a desired point. The use of a shear blade adapted to engage the strap, and means engaging the buckle for applying an opposing force through the buckle, insure that the buckle itself is effectively utilized as one of the jaws, so to speak, of a cutting mechanism of which the other jaw is the shear blade. The use of a cam to operate the tool parts which are utilized in the final shearing operation, permits the cam actuating handle to be placed in a non-interfering position when not in use, and also permits the application of considerable force through the buckle. When the opposing force is applied to the opposite end of the buckle, i. e., the end of the buckle opposite the position of the shear blade, the shearing force applied by the shear blade to the strap and the opposing force applied to the opposite end of the buckle are more nearly in the same plane, so that there is little or no tendency for twisting of the buckle or the clamp. When the opposing force is applied to the opposite end of the buckle which is at least a substantial portion of the width of the strap, there is little tendency for deformation of the opposite end of the buckle, and also little tendency for the buckle to twist in the tool during the shearing operation. When the tool is made in the form of an attachment for an existing type of tool, the cost of producing a tool, which will satisfactorily produce a flush cut clamp of the type described, is considerably reduced, since the existing type of tool can be used for the purposes for which it was made, while the attachment permits the new type of pressure clamp to be applied in an easy and satisfactory manner, without the necessity for the purchase by the user of a complete additional tool. Of course, the operating parts of the attachment can be incorporated in a tool which preserves only the strap clamping and tensioning means.

Although different embodiments of this invention have been illustrated and described, it will be understood that other embodiments may exist, as well as variations therein, without departing from the spirit and scope of this invention.

What is claimed is:

1. A tool for applying a pressure clamp or the like, said tool having a nose end, such pressure clamp including a buckle or the like having opposite ends and a strap adapted to pass through said buckle and to be attached thereto, said tool comprising means for applying tension to one end of said strap so as to tighten said strap around an article to be clamped, a bar mounted on and extending across the nose end of said tool for engaging one end of said buckle while said strap is tensioned and while said strap is bent up against said end of said buckle; a shear blade mounted on and extending across the nose end of said tool in spaced relation to said bar and thereby forming a passage through which said strap passes, said shear blade being adapted to shear said strap; a lever pivoted on the nose end of said tool for engaging the opposite end of said buckle; and a cam for actuating said lever when it is in engagement with said buckle, said lever applying a force through said buckle against said strap and said shear blade applying a cutting force against and on the other side of said strap opposite said buckle and shearing said strap close to said buckle when said lever is actuated by said cam.

2. A tool for applying pressure clamps, as defined in claim 1, wherein said lever is provided at its outer end with a transverse groove on the underside to provide a wide point for engaging said opposite buckle end.

3. An attachment for a tool for applying a pressure clamp, such pressure clamp including a buckle or the like having opposite ends and an upper surface and a strap adapted to pass through said buckle and to be attached thereto and said tool including means for applying tension to one end of said strap so as to tighten said strap around an article to be clamped; said tool also being adapted to be moved relatively to said buckle so as to bend said strap upwardly against one end of said buckle so that one side of said strap abuts said end of said buckle, said attachment comprising bracket means for mounting the same on said tool; a shear blade mounted on said bracket means for applying a shearing force against said strap at said one end of said buckle at a slight angle and upwardly in a direction toward the upper surface of said buckle and on the side of the strap opposite to the side which abuts said buckle end so as to sever said strap substantially flush with the top of said buckle; a lever mounted on said bracket means engageable with said buckle for applying force to said buckle in a direction toward said bent up portion of said strap and means mounted on said bracket means including a handle for applying force to said lever causing said lever to apply a force through said buckle toward and against said bent up portion of said strap while said shear blade applies shearing force against the other side of the bent up portion of said strap.

4. An attachment for a tool for applying a pressure clamp or the like, such pressure clamp including a buckle or the like having opposite ends and a strap adapted to pass through said buckle and to be attached thereto and said tool including means for applying tension to one end of said strap so as to tighten said strap around an article to be clamped, and said tool having an elongated nose normally adapted to be positioned against one said buckle end for tightening said strap, said attachment comprising a frame for at least partly encircling the nose of said tool, said attachment frame having a bar extending transversely at the front and adapted to be positioned against said buckle end; a shear blade disposed opposite said bar and adapted to apply a shearing force against said strap at said buckle end, said tool and attachment being adapted to be rotated relative to said buckle so as to bend said strap upwardly against said buckle end and thereby position said shear blade to sever said strap along a line extending upwardly to the upper surface of said buckle at said end; and means including a buckle-engaging lever mounted on said frame for engaging the opposite end of said buckle for applying a force through said buckle against said strap in a direction opposed to the direction of the shearing force exerted on said strap by said shear blade, said buckle exerting a force against one side of said strap and the shear blade exerting a shearing force against the opposite side of said strap.

5. A tool for applying a pressure clamp or the like, such pressure clamp including a buckle or the like having opposite ends and a strap adapted to pass through said buckle and to be attached thereto and said tool including means for applying tension to one end of said strap so as to tighten said strap around an article to be clamped, a frame along which said clamping means is movable, and a nose having a slot through which said strap passes, the improvement which comprises an extension of said nose forming a bar extending transversely at the front and adapted to be positioned against said buckle end; a shear blade disposed opposite said bar and adapted to apply a shearing force against said strap at said buckle end; a bracket having upwardly extending sides, open at the front and connected at the rear by a back, said sides being provided with laterally extending ears at the front; a cap screw extending through each said ear and said bar and attaching said shear blade to said bar, said shear blade having an upper slot forming passage for said strap beneath said bar and said shear blade also having a rearwardly slanting groove on the underside wider than said buckle, the front edge of said groove being rounded and the front edge of said slot being beveled; a pivoted lever having an upwardly slanting front edge and a notch on the underside providing a wide point for engaging said opposite end of said buckle; a pivoted cam for engaging said lever from above; a handle for said cam; a pivot pin for said lever extending transversely between said bracket sides at a lower rear position; and a pivot pin for said cam extending transversely between said bracket sides at an upper forward position.

6. A tool for applying a pressure clamp including a strap and a buckle through which said strap passes, said buckle having an upper surface and an end extending transversely to said strap, one end of said strap being attached to said buckle and said strap passing for at least one loop around an article to be clamped and through said buckle, said tool having a frame having a nose end and means mounted on said frame for applying tension to said strap, a strap cutting mechanism on said frame, said strap cutting mechanism comprising a shear blade mounted on said frame at its nose end for applying a shearing force against one side of said strap at said end of said buckle and in a direction toward said buckle to sever said strap while said strap is bent upwardly against said end; means including a lever mounted on said frame and spaced from said shear blade for engaging said buckle and applying an opposing force through said buckle against the other side of said upwardly bent portion of said strap and in a direction opposed to the direction of the shearing force exerted by said shear blade; and means including a cam engaging said lever for actuating said buckle engaging means.

7. An attachment for a tool for applying a pressure clamp or the like, such pressure clamp including a buckle or the like having opposite ends and a strap adapted to pass through said buckle and to be attached thereto and said tool including means for applying tension to one end of said strap so as to tighten said strap around an article to be clamped, and said tool having an elongated nose normally adapted to be positioned against one said buckle end for tightening said strap, said attachment comprising a frame for at least partly encircling the nose of said tool and having a bracket provided with upwardly extending sides, open at the front and connected at the rear by a back, said sides being provided with laterally extending ears at the front and said attachment frame also having a bar extending transversely at the front and adapted to be positioned against said buckle end; a shear blade disposed opposite said bar and adapted to apply a shearing force against said strap at said buckle end, said tool and attachment being adapted to be rotated relative to said buckle so as to bend said strap upwardly against said buckle end and thereby position said shear blade to sever said strap along a line extending upwardly to the upper surface of said buckle at said end; a cap screw extending through each said ear of said frame and attaching said shear blade to said frame, said shear blade having a rearward extension engaging said tool nose and an upper slot forming a passage for said strap beneath said frame bar, said shear blade also having a rearwardly slanting groove on the underside wider than said buckle, the front edge of said groove being rounded and the front edge of said slot being beveled; a pivoted lever having an upwardly slanting front edge and a notch on the underside providing a wide point for engaging said opposite end of said buckle, for applying an opposing force through said buckle; a pivoted cam for engaging said lever from above; a handle for said cam and attached thereto; a pivot pin for said lever extending transversely between said bracket sides at a lower rear position; and a pivot pin for said cam extending transversely between said bracket sides at an upper forward position.

8. In a tool for applying a pressure clamp including a strap and a buckle through which said strap passes, said buckle having an upper surface and having a first end and a second end extending transversely to said strap, the inner end of said strap being attached to said buckle and said strap passing for at least one loop around an article to be clamped and through said buckle with a free end portion of said strap protruding from said buckle, said tool comprising a frame having a nose end and including means for tensioning said strap by a force applied on said strap between its free end and said buckle and for bending said free end portion of said strap in a direction outwardly from said loop and against said first end of said buckle in abutting relation while at least a portion of the tension on said strap is maintained, the improvement which comprises a strap cutting mechanism which includes a bar and a shear plate mounted on the nose end of said tool, said bar and shear plate being mounted to permit the protruding free end portion of said strap to pass therebetween, a lever mounted on said nose end having a portion engageable with said second end of said buckle and a member engaging said lever and having a handle for applying a force on said member which is transmitted to said lever to cause said lever to exert a force against said second end of said buckle through said buckle against one side of said strap in a direction toward said shear plate, said shear plate being spaced from said lever and exerting a strap cutting force on the other side of said strap in a direction toward said lever when said lever is caused to exert a force through said buckle toward said shear plate.

9. A tool for applying a pressure clamp including a strap and a buckle through which said strap passes, said buckle having an upper surface and a first end and a second end extending transversely to said strap, one end of said strap being attached to said buckle and said strap passing for at least one loop around an article to be clamped and through said buckle with the end portions at the other end of said strap protruding from said buckle, said tool comprising a frame having a nose end, means on said frame for grasping the protruding end portion of said strap and for applying tension to said strap, and for bending the protruding end portion of said strap outwardly from said loop and against the first end of said buckle, strap cutting mechanism mounted on the nose end of said frame, said mechanism comprising a shear blade means on said nose end for applying a shearing force against the protruding end portion of said strap when bent outwardly from said loop and against said first end of said buckle, a lever mounted on said nose end and spaced from said shear blade and having a portion engageable with the second end of said buckle for applying a force through said buckle in a direction toward and against the portion of said strap bent against said buckle, and handle means mounted on said nose end adjacent said lever and having a member engaging said lever for actuating said lever, said buckle and shearing blade exerting forces toward said bent portion of said strap against and on opposite sides of said strap to shear said strap adjacent said buckle when said lever is actuated to apply force through said buckle.

10. A tool as specified in claim 9, wherein the said member engaging said lever for actuating said lever is cam shaped.

11. A tool for applying a pressure clamp including a strap and a buckle through which said strap passes, said buckle having an upper surface and an end extending transversely to said strap, the inner end of said strap being attached to said buckle and said strap passing for at least one loop around an article to be clamped and through said buckle with its outer end portion protruding beyond said end of said buckle, said tool comprising a frame, means mounted on said frame for applying tension to said strap, said tool being adapted to bend said free end portion of said strap against said buckle end in a direction outwardly from said loop, a shear blade mounted on said frame for applying a shearing force in a direction toward said buckle against said strap at said free end portion of said strap to sever said strap while said strap is bent upwardly against said end; means including a lever mounted on said frame for engaging said buckle and applying an opposing force through said buckle against the bent up portion of said strap and in the direction of said shearing blade but opposite to the direction of the cutting force exerted on said strap by said shear blade, and means including a cam engaging said lever for actuating said buckle engaging lever.

12. A tool for applying a pressure clamp or the like, such pressure clamp including a buckle or the like having opposite ends and a strap adapted to pass through said buckle and to be attached thereto and said tool including means for applying tension to one end of said strap so as to tighten said strap around an article to be clamped, a frame along which said clamping means is movable, and a nose having a slot through which the free end portion of said strap passes, a bar mounted on said nose and extending transversely at the front of said nose and adapted to be positioned against said buckle at one end thereof, a shear blade disposed opposite said bar and adapted to apply a shearing force against said strap at said buckle end; means mounting said bar and shear blade on said nose, a bracket mounted on said nose having upwardly extending sides and open at the front; a pivoted lever mounted between said upwardly extending sides having a notch on the underside providing a wide point for engaging the opposite end of said buckle; a pivoted cam mounted between said upstanding sides engaging said lever for actuating said lever, said lever when in engagement with said opposite end of said buckle and actuated by said cam exerting a force through said buckle on said strap and said shear blade simultaneously exerting a force on said strap in a direction opposite to the direction of force exerted through said buckle.

13. An attachment for a tool for applying a pressure clamp or the like, such pressure clamp including a buckle or the like having opposite ends and a strap adapted to pass through said buckle and to be attached thereto and said tool including means for applying tension to one end of said strap so as to tighten said strap around an article to be clamped, and said tool having an elongated nose normally adapted to be positioned against one end of said buckle for tightening said strap, said attachment comprising a frame for at least partly encircling the nose of said tool and having a bracket provided with upwardly extending sides and open at the front end, said attachment frame also having a bar extending transversely at the front and adapted to be abutted against said buckle end; a shear blade disposed opposite said bar and adapted to apply a shearing force against said strap at said buckle end, said tool and attachment being adapted to be rotated relative to said buckle so as to bend said strap upwardly against said buckle end and thereby position said shear blade to sever said strap along a line extending upwardly to the upper surface of said buckle at said end; a pivoted lever mounted between said upwardly extending sides for applying a force through said buckle toward said shear blade, a pivoted cam mounted between said upstanding sides engaging said lever for actuating said lever, said shear blade exerting a cutting force against said strap simultaneously as said buckle exerts an opposing force against the other side of said strap when said lever is actuated by said cam.

References Cited in the file of this patent

UNITED STATES PATENTS

| 1,039,096 | Christenson | Sept. 24, 1912 |
| 1,836,147 | Wright | Dec. 15, 1931 |
| 2,150,234 | McKee | Mar. 14, 1939 |
| 2,208,134 | McAneny | July 16, 1940 |
| 2,312,400 | Govanus | Mar. 2, 1943 |

FOREIGN PATENTS

| 595,841 | France | Oct. 9, 1925 |